VAPOR PRESSURE vs. TEMP. 30°C SATURATED SOLUTIONS OF LiBr, LiBr:CsBr & LiBr:LiSCN IN VARIOUS MOLE RATIOS

VAPOR PRESSURE Vs TEMP. 22°C SATURATED SOLUTIONS OF LiBr & LiBr:LiSCN IN VARIOUS MOLE RATIOS

INVENTORS
ROBERT A. MACRISS
& WILLIAM F. RUSH
BY Bair, Freeman & Molinare
ATTORNEYS

3,541,013
LITHIUM BROMIDE-LITHIUM THIOCYANATE-WATER COMPOSITION FOR AN ABSORBENT-REFRIGERATION SYSTEM
Robert A. Macriss, Deerfield, and William F. Rush, Arlington Heights, Ill., assignors, by mesne assignments, to American Gas Association, Inc., New York, N.Y., a membership corporation of New York
Filed Jan. 24, 1968, Ser. No. 700,111
Int. Cl. C09k 3/02; F25b 17/10
U.S. Cl. 252—69                      4 Claims

ABSTRACT OF THE DISCLOSURE

The specification discloses a refrigerant-absorbent solution for use in an air-cooled absorption-refrigeration system that has a lower viscosity than prior art solutions, and does not undergo crystalliaztion at temperatures prevalent in an air-cooled system. The working fluid comprises water in combination with lithium bromide-thium thiocyanate mixtures as the absorbent. The absorbent is of high solubility and the resultant working fluid has low heat capacity, low viscosity, is non-corrosive, non-toxic, thermally stable, and is a solution having a small heat of dilution.

FIELD

This invention relates to refrigeration in accordance with the absorption refrigeration principle and more particularly to an absorbent possessing improved characteristics over known working fluids for use with an air cooled absorption refrigeration system.

BACKGROUND

Generally speaking, the absorption cycle uses two fluid streams in a totally enclosed system. One of these fluid streams is the refrigerant, which provides the cooling effect; the other is the absorbent, which conveys the refrigerant through part of the cycle. The major components of the system are a generator, condenser, evaporator, absorber, and heat exchanger. The refrigerant passes through all units; the absorbent is confined to movement through the generator, heat exchanger, and absorber. In this cycle no mechanical compressor is needed.

In operation, a mixture of absorbent and refrigerant is heated in the generator to boil off some of the refrigerant, which rises as vapor to the condenser. The generator and condenser operate at relatively high pressure, so the condensing temperature of the refrigerant is sufficiently high to permit rejecting the latent heat to the ambient air or cooling water. The liquid refrigerant is throttled to lower pressure so it will boil at relatively low temperature in the evaporator and thus absorb heat from the air to be cooled. The vaporized refrigerant passes to the absorber, where it dissolves in cool absorbent solution which has come to the absorber from the generator outlet. The cool solution, now rich in refrigerant, is pumped back to the generator to continue the process.

In the past, a lithium bromide-water combination refrigerant-absorbent has been utilized in systems of the type described above. However, in attempting to adapt this combination to an air cooled operation a number of problems were presented. First, the limiting operating temperature for a lithium bromide-water solution in a water cooled system with an evaporator temperature of 40° F. is approximately 120° F. For air cooled operation the solution temperature in the absorbent would have to be raised to approximately 140° F. This would require a higher concentration of lithium bromide in order to maintain the boiling of the refrigerant water in the evaporator at 40° F. Solubility limitation prevents further dissolution of lithium bromide and water and causes the salt to crystallize thereby resulting in a "freeze up" of the system.

There is disclosed in U.S. Pat. 3,004,919 a working fluid utilizing water as a refrigerant with a combination of lithium bromide-cesium bromide as the absorbent. In comparison to that system, the system of the present invention offers a much lower vapor pressure, and a lower viscosity, and therefore improved characteristics for use in an air-cooled absorption refrigeration system.

OBJECTS

It is therefore an object of the present invention to provide a substantially better working fluid for use with an air cooled absorption refrigeration system than that which has been proposed in the past.

A further object of this invention is to provide a refrigerant-absorbent solution for use with an air-cooled absorption refrigeration system which would not undergo a crystallization at the temperatures and pressures occasioned in an air-cooled system.

Still another, and more specific object of this invention is to provide a salt which when added to a lithium bromide solution affords a sufficient vapor pressure depression to operate an air-cooled absorption-refrigeration system.

A specific object of this invention is the provision of a working fluid containing water as a refrigerant and a lithium bromide-lithium thiocyanate mixture as the absorbent.

Another object is to afford a salt possessing the following characteristics for use as an absorbent:

(1) Be of high solubility so that the vapor pressure of the solution is significantly less than for ideal solutions.
(2) Yield solutions with low heat capacity and viscosity.
(3) Be non-corrosive.
(4) Be able to yield a solution with as small a heat of dilution as compatible with other properties.
(5) Be non-toxic.
(6) Be economically feasible for use with an absorption refrigeration system.

Still other objects will be evident from the detailed description which follows.

DETAILED DESCRIPTION

The details of the invention will be described with reference to the following figure in which.

We have discovered that a working fluid containing water as refrigerant and lithium bromide-lithium thiocyanate mixtures as the absorbent in the range of about 0.25–4.00 mole LiBr to LiSCN, show improved refrigeration characteristics.

Because of its many advantages it was decided by applicants to utilize water as a refrigerant in their search to find an improved absorbent. However, it is to be understood that although this description for illustrative purposes uses water as refrigerant, it is not meant that the absorbent, which is the subject matter of the present invention, must be used in conjunction with a water refrigerant, unless expressly claimed.

One of the most important criteria in choosing a salt for use in a water-salt system of the type discussed herein is its solubility, since generally the more of a given salt in solution the lower will be the vapor pressure of the solution. However, increasing the amount of salt does not predictably lead to a lowering of the vapor pressure; we have discovered this is particularly true in the case of the multi-component system of this invention, and as compared to other multi-component systems. For this system the increasing vapor pressure lowering is dependent on both the mole ratio of component salts, and the total amount of salt in solution.

EXAMPLE I

The vapor pressures of a series of 30° C. saturated water solutions of LiBr, Li-Br-CsBr, and LiBr-LiSCN were measured as a function of temperature to ascertain the vapor pressure lowering characteristics. The results are shown in Table 1.

TABLE 1

| Absorption solution system | Salt mole ratio | Concentration | | Vapor pressure at 140° C., mm. Hg at 4° C. |
|---|---|---|---|---|
| | | Total salt, g./100 g. $H_2O$ | Total salt, wt. percent | |
| LiBr-LiSCN-$H_2O$ | $\frac{LiBr}{LiSCN} = \frac{0.25}{1}$ | 201 | 66.8 | 4.3 |
| LiBr-LiSCN-$H_2O$ | $\frac{LiBr}{LiSCN} = \frac{0.80}{1}$ | 205 | 67.2 | 5.0 |
| LiBr-CsBr-$H_2O$ | $\frac{LiBr}{CsBr} = \frac{4.25}{1}$ | 295 | 74.7 | 8.6 |
| LiBr-$H_2O$ | | 165 | 62.3 | 12.7 |

Figure 1:
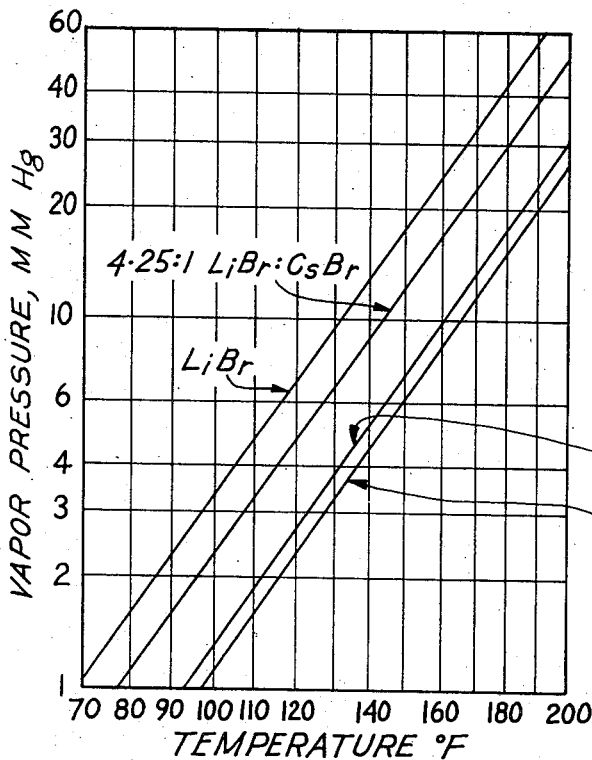
FIG. 1 is a graphic illustration of the relative vapor pressures vs. temperature characteristics of the prior art $H_2O$-LiBr system and the water-lithium bromide-cesium bromide system as compared to the $H_2O$-LiBr-LiSCN system of the present invention.

These results are plotted graphically in FIG. 1 and show the unexpected vapor pressure lowering of the three component systems of this invention, as illustrated by the lower two lines in FIG. 1.

EXAMPLE 2

The vapor pressure vs. temperature characteristics of 22° C. saturated water solutions of various salt mole ratios of LiBr-LiSCN were compared to LiBr and the results are given below in Table 2.

TABLE 2

| Run No. | Mole ratio LiBr/LiSCN | Concentration | | Vapor pressure at 140° C., mm. Hg at 4° C. |
|---|---|---|---|---|
| | | Total salt, g./100 of $H_2O$ | Wt. percent | |
| 1 | 0.25:1 | 174 | 63.5 | 5.7 |
| 2 | 0.80:1 | 171 | 63.1 | 6.3 |
| 3 | 1.00:1 | 175 | 63.6 | 7.2 |
| 4 | 4.00:1 | 176 | 63.7 | 8.3 |

Figure 2:
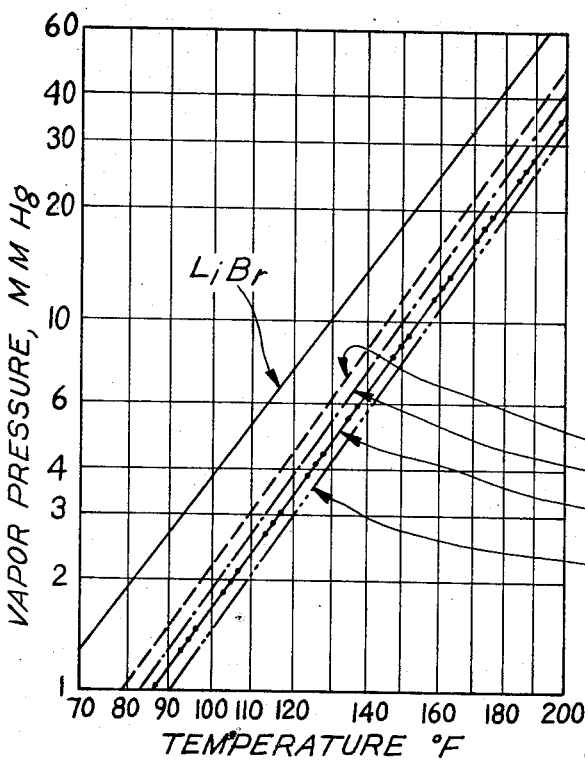
FIG. 2 is a graphic illustration representing the vapor pressure vs. temperature characteristics of the prior art $H_2O$-LiBr system as compared to various mole ratios of the $H_2O$-LiBr-LiSCN system of the present invention.

The results are plotted graphically in FIG. 2 and show relative lowering of the preferred range of 0.25-4.00 mole LiBr per mole LiSCN.

In view of the teachings set forth herein, it can be seen that the lower vapor pressure and viscosity achieved by the combination of lithium bromide-lithium thiocyanate absorbent to the other refrigerant to form a working fluid in the various mole ratios disclosed affords a definite advantage over the single salt in water system, lithium bromide-water used in the past. The 3-component system of the present invention also shows improvement as compared to double-salt combinations such as lithium bromide-cesium bromide. This invention thereby provides an absorbent-refrigerant combination which possesses the qualities necessary for use in air-cooled absorption refrigeration systems.

While we have described our invention in connection with specific embodiments thereof, they are to be understood as being merely illustrative not by way of limitation of the scope of our invention, which is defined solely by the appended claims which should be construed as broadly as the prior art will permit.

We claim:
1. An absorbent composition for an absorption refrigeration system consisting of a mixture of lithium bromide and lithium thiocyanate, said lithium bromide being present in a ratio of 0.25 to 4.00 moles per mole of lithium thiocyanate.

2. An absorbent composition as in claim 1 wherein said lithium bromide is present in an amount of about 0.25 mole per mole of lithium thiocyanate.

3. A working fluid for use in an air-cooled absorption-refrigeration system comprising water as the refrigerant, and lithium bromide and lithium thiocyanate mixtures as the absorbent in solution therein, said lithium bromide being present in a ratio of 0.25 to 4.00 moles per mole of lithium thiocyanate.

4. A working fluid as in claim 3 wherein said lithium bromide is present in an amount of about 0.35 mole per mole of lithium thiocyanate.

References Cited

UNITED STATES PATENTS 3,296,814   1/1967   Lynch et al. _____ 252—69
3,458,445   7/1969   Macriss et al. _____ 252—69

LEON D. ROSDOL, Primary Examiner

I. GLUCK, Assistant Examiner

U.S. Cl. X.R.
62—112; 252—67